UNITED STATES PATENT OFFICE.

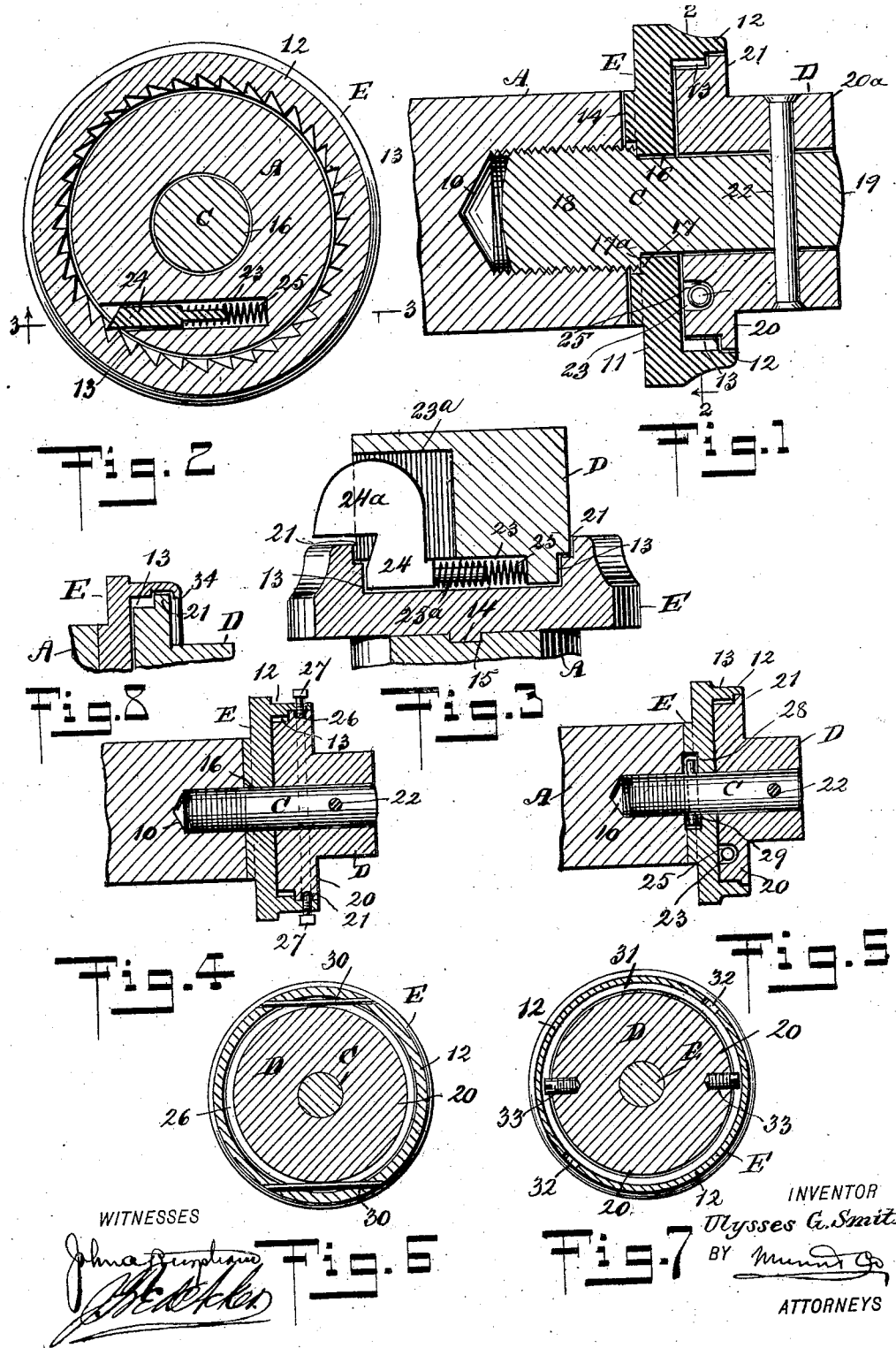

ULYSSES GRANT SMITH, OF LANSFORD, PENNSYLVANIA.

LOCK-BOLT.

No. 853,133.   Specification of Letters Patent.   Patented May 7, 1907.

Application filed August 17, 1906. Serial No. 330,993.

*To all whom it may concern:*

Be it known that I, ULYSSES GRANT SMITH, a citizen of the United States, and a resident of Lansford, in the county of Carbon and State of Pennsylvania, have invented a new and Improved Lock-Bolt, of which the following is a full, clear, and exact description.

The purpose of the invention is to provide a very simple, economic, durable and effective lock bolt adapted as a locking bolt and nut for an end of a vehicle axle, for example, or for use wherever an ordinary bolt and nut is applicable and it is desired to lock the nut and bolt against turning.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a longitudinal section through the improved device applied to a vehicle axle; Fig. 2 is a transverse section taken practically on the line 2—2 of Fig. 1; Fig. 3 is a section taken at right angles to the section shown in Fig. 2 and practically on the line 3—3 of said Fig. 2; Figs. 4 and 5 are smaller longitudinal sectional views of slightly modified types of the device; Figs. 6 and 7 are transverse sectional views of further modified forms of the locking bolts, also drawn upon a smaller scale; and Fig. 8 is a detail sectional view of a portion of the device, illustrating a further slight modification.

A represents an end of an axle for a vehicle, in the center of which end portion a longitudinal threaded recess 10 is produced.

C represents the improved locking bolt, E the washer employed in connection with the bolt, and D the nut employed in connection with the washer.

The washer E consists of a body section 11 provided with an outwardly-extending marginal annular flange 12, as is shown in Figs. 1 and 3; and in the inner face of said flange adjacent to its body a series of circumferentially arranged ratchet teeth 13 is produced, as is shown in Figs. 1 and 2, but said teeth are of less length than the width of the flange 12, leaving a space between the outer ends of the teeth and the outer edge of said flange, as is shown in both Figs. 1 and 3.

At what may be termed the back or inner face of the body of the washer E opposing lugs 14 are produced, adapted to slide in slots 15 produced in the axle A and extending to the recess 10. The lugs 14 stop short of the central plain opening 16 in the washer, forming thereby plain bearings 17. The inner end 18 of the locking bolt C is of greater diameter than the remaining portion thereof, and the larger section 18 only of the locking bolt is threaded to enter the recess 10 in the axle A; and the shoulder $17^a$ formed by the reduction in diameter of the outer end portion of the locking bolt engages with the bearing surface 17 on the washer E when the washer is in place on the axle and the bolt is screwed therein as is shown in Fig. 1; and in this manner the bolt is prevented from turning to a great extent and the attachment between the washer E and the axle A prevents the washer turning on the axle.

The outer end 19 of the bolt C is exteriorly smooth and extends through a smooth central bore in the nut D. The nut D is provided with an annular head section 20 of greater diameter than its body section, its body section designated as $20^a$ being polygonal so that it can be engaged by a wrench or spanner. The head portion 20 of the nut D is of such diameter at its inner portion as to clear the ratchet teeth 13 when introduced within the flanged portion of the washer, as shown in Fig. 1; and at the outer portion of the said head an annular bead 21 is provided, which enters and fills the space between the outer ends of the teeth 13 and the outer edge of the flange 12 of the sleeve, thus concealing the ratchet teeth while the nut is in position relatively to the washer. The body of the nut is secured to the locking bolt C by means of a suitably riveted pin 22 passed through the bolt and the body of the nut.

A horizontal recess 23 is made in the head portion 20 of the nut D, as is best shown in Figs. 2 and 3, which recess extends out through the outer face of the body portion of said nut, as is particularly shown in Fig. 2, and a pawl 24 is held normally in engagement with the ratchet teeth 13 by means of a spring 25 having bearing against a rear wall of a pocket in the recess 23, which spring encircles a stem $25^a$ attached to said pawl and exerts outward pressure upon the pawl. The pawl 24 is provided with a head $24^a$ which extends outward from the engaging edge of said pawl, and also extends out through the recess $23^a$ in the nut, so that when it is desired to remove the nut and consequently the bolt connected therewith from the article to which the bolt has been secured, it is simply necessary to press the head of the pawl inward and then turn the nut D, which can be done by the application of a spanner or similar tool capable of pressing in the pawl and holding it in its inner position while the nut is being turned.

It is evident that when the parts are assembled as has been described, and the pawl 24 is in engagement with the ratchet teeth of the washer E, it is impossible for the bolt C or the nut D to work loose.

The shoulder 17$^a$ is for the purpose of preventing the washer E from leaving the bolt C when the device is not in use, insuring the proper assemblage of all of its parts.

In Fig. 4 the bolt C is of even diameter throughout and the shoulder 17$^a$ is omitted, the washer E being held in proper position relative to said bolt C by producing an annular groove 26 in the bead or rib 21 of the head of the nut D, and causing screws 27 to pass through the flange of the washer E into said groove; whereas, in the construction shown in Fig. 5 a recess 28 is made in the central portion of the inner face of the washer E, and a pin 29 is passed through the bolt C, extending into said recess beyond opposite sides of the bolt and out of engagement with the walls of the recess.

The construction shown in Fig. 6 is practically that illustrated in Fig. 4 except that pins or bolts 30, the equivalents of the screws 27 are passed through the groove 26 from side to side of the sleeve flange 12 transversely of the bolt C instead of at an angle to the said main bolt. Finally, in the construction shown in Fig. 7, a groove 31 is made in the inner face of the plain portion of the washer flange 12, and apertures 32 are likewise produced in the same portion of the flange 12 leading to the groove 31. Screws 33 are passed through said apertures into the head 20 of the nut D until their heads are within the groove 31 free of its walls.

In the construction shown in Fig. 8, a malleable extension 34 is provided for the flange 12 of the washer E, and said extension 34 is bent over the offset 21 of the nut D, to hold the nut and washer together.

It will be observed that the essential elements in all the forms of the device are the same, the only practical difference being in the manner of holding the washer in position on the bolt when the device is not in use.

Having thus described my invention, I claim as new, and desire to secure by Letters Patent,—

1. In locking bolts, a bolt having a threaded and a plain section, a washer loosely mounted upon the plain section of the bolt, means for preventing the washer slipping over the threaded section of the bolt, devices for holding the washer stationary when the bolt is applied to an object, a nut secured to the plain portion of the bolt, having its inner face closely opposed to the outer face of said washer, a pawl and ratchet connection between the nut and the washer, and means for releasing the pawl of said mechanism from the exterior of the nut.

2. In locking bolts, a bolt having a threaded and a plain section, a washer loosely mounted upon the plain section of said bolt, means for preventing the washer sliding over the threaded section of the bolt, means for holding said washer stationary when said bolt is applied to an object, an annular flange formed at the peripheral portion of said washer, ratchet teeth at the interior of said flange, a nut secured to the plain section of the bolt, a portion of said nut entering the space surrounded by the flange of the said washer, and a spring-controlled pawl carried by said nut and adapted for engagement with the teeth on the washer flange, and means for operating said pawl.

3. In locking bolts, the combination with a bolt having a threaded section and a plain section, a washer loosely mounted on the said plain section of the bolt, said washer being provided with an outwardly-extending marginal flange and teeth on the inner face of said flange, devices for holding the washer stationary when the bolt is applied to an object, and means for preventing the washer from accidentally slipping over the threaded section of said bolt, of a nut comprising a body portion secured to the plain section of said bolt, and a head section which enters the space surrounded by the washer flange, and a spring-controlled pawl carried by the said nut, engaging with the teeth of said washer flange, the said pawl being provided with a head that extends out beyond the outer face of the body portion of said nut.

In testimony whereof I have signed my name to this specification in the presence of two subscribing witnesses.

ULYSSES GRANT SMITH.

Witnesses:
JOHN L. LEWIS,
JOHN A. QUINN.